Aug. 25, 1942.                H. S. MAY                2,293,751
                KNEELER AND METHOD OF MAKING THE SAME
                        Filed Feb. 16, 1940
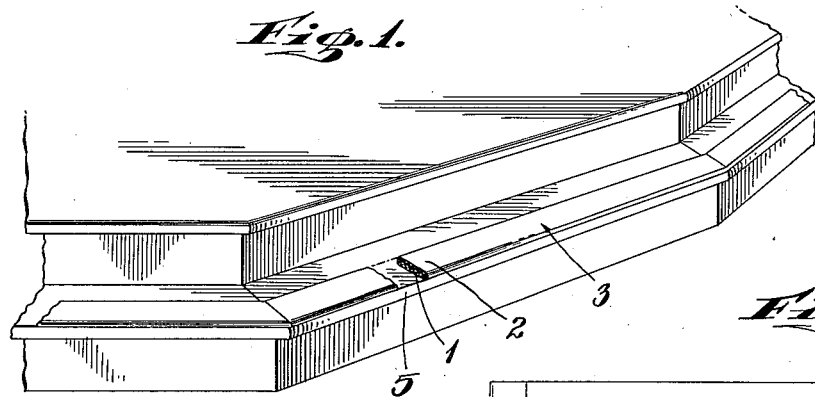
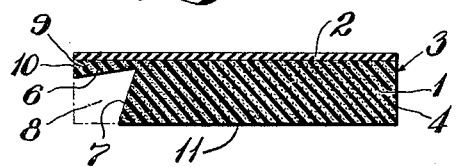
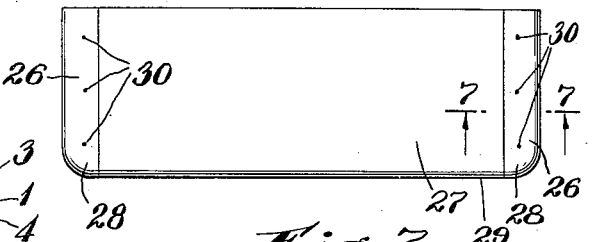
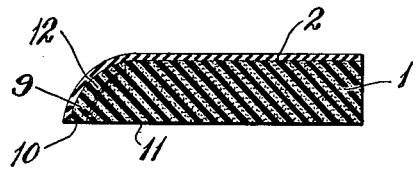
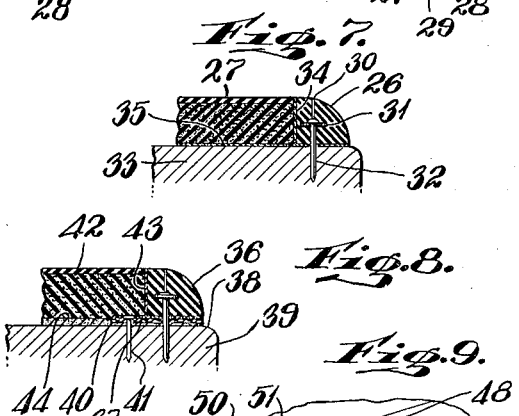
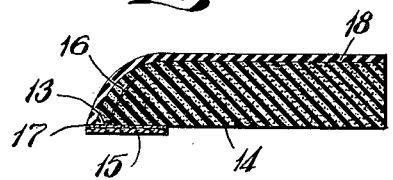
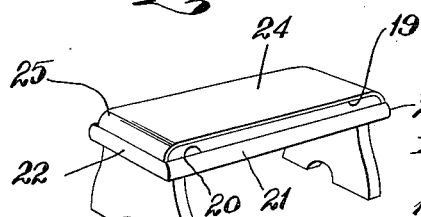
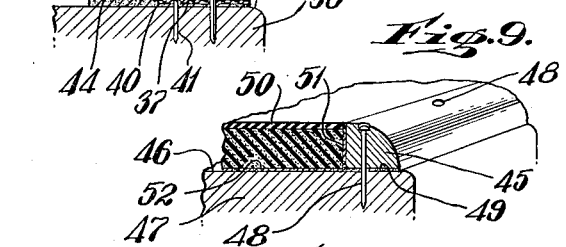
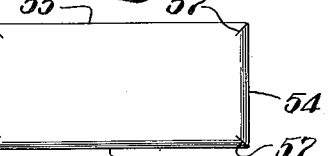
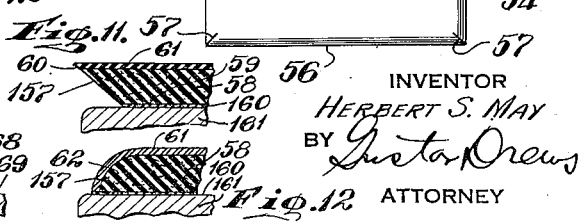
INVENTOR
HERBERT S. MAY
BY Gustav Drews
ATTORNEY Patented Aug. 25, 1942　　　　　　　　　　　　　2,293,751

UNITED STATES PATENT OFFICE 2,293,751

KNEELER AND METHOD OF MAKING THE SAME

Herbert S. May, Great Neck, N. Y., assignor to Voorhees Rubber Mfg. Co., Inc., New York, N. Y., a corporation of Delaware Application February 16, 1940, Serial No. 319,254

8 Claims. (Cl. 155—166)

This invention relates to an improved kneeler for a church pew, priedieu, altar step, communion rail, and the like, composed of a sponge rubber base and a wear-resisting facing material, and the method of making the same.

Among the objects of the present invention it is aimed to provide an improved kneeler for a church pew, priedieu, altar step, communion rail, and the like, composed essentially of a sponge rubber base, a serviceable or wear resisting facing material such as a dense, relatively hard rubber material, a fabric, a leatherette or the like, secured to the base by a suitable adhesive such as rubber cement, vulcanization or the like, portions of the base being cut adjacent the ends and/or sides thereof, the remaining portions folded down and the facing material extending down to the lower level of the base at the ends and/or sides effectively to conceal the base material.

It is still another object of the present invention to provide an improved kneeler for a church pew, priedieu, altar step, communion rail, or the like, composed essentially of a sponge rubber base, a facing material such as a dense, relatively hard rubber material, a fabric, a leatherette or the like, secured to the base, with portions of the base being removed adjacent to the end and/or sides, the remaining portions folded down and the facing material extending down to the lower level of the base at the end and/or side effectively to conceal the base material at the end and/or side, and a fabric reenforcement secured to the lower face of the base adjacent the portion removed to reenforce the same.

It is still another object of the present invention to provide an improved kneeler composed essentially of a sponge rubber base, a dense, relatively hard rubber facing material secured to the base, and rounded end portions secured to the base effectively to conceal the sponge rubber base. Such rounded end portions may comprise a dense, relatively hard rubber rounded molding adhesively secured to the edge of the rubber base and facing material, or else a portion of the sponge rubber base is removed or cut off, and the remaining portion of the base bent down with the facing material extending to the lower level of the sponge rubber base and adhesively secured in place either by a fabric or to the support of the rubber base.

These and other features, capabilities, and advantages of the invention will appear from the sub-joined detail description of specific embodiments thereof illustrated in the accompanying drawing, in which Figure 1 is a fragmental perspective of an altar step equipped with a kneeling pad made according to one embodiment of the present invention;

Fig. 2 is a section of a piece of stock at the end of one step of one process of manufacture;

Fig. 3 is a section of the piece of stock shown in Fig. 2 at the end of the second step during the course of its manufacture;

Fig. 4 is a section of another embodiment at the end of a third step of its manufacture;

Fig. 5 is a perspective of a kneeling bench equipped with a rubber mat made according to the aforesaid embodiments of the present invention;

Fig. 6 is a plan of another embodiment of a kneeling mat for a kneeling bench;

Fig. 7 is a section on the line 7—7 of Fig. 6;

Fig. 8 is a section of another embodiment similar to the section illustrated in Fig. 7;

Fig. 9 is a section of still another embodiment similar to the section illustrated in Fig. 7;

Fig. 10 is a plan of still another embodiment of a kneeling mat for a kneeling bench;

Fig. 11 is a section of stock after having undergone a step of another embodiment of the present invention;

Fig. 12 is a section of the stock illustrated in Fig. 11 after the completion of a second step; and Fig. 13 is a section of still another embodiment.

In the embodiment shown in Figs. 1, 2 and 3, the base 1 preferably composed of sponge rubber, of about one-half inch to three-quarter inch in thickness, has secured to an upper face thereof by a suitable adhesive, rubber cement, vulcanization or the like, a suitable wear-resisting facing material 2 such as a fabric, a leatherette, or the like. In the present instance, the facing material 2 shown is illustrated as composed of a relatively dense, hard rubber material of about one-sixteenth of an inch to one-eighth of an inch in thickness. This facing material may be colored to suit the requirements, a marble colored finish being suitable for church work and the like.

According to the present embodiment, the article constituting an important part thereof is produced in the manner now to be described. The base 1 with its rubber facing material 2 is stocked up in strips 3 having widths of as great as fifty-four inches in lengths of thirty feet or more. It is desirable to stock up the material in such overall sizes, since the size of kneeling mats either as to width or length are not conventional by any means, one and the same church not infrequently requiring mats that have six or more different widths and six or more different lengths, found necessary on account of the varying widths and lengths of pews, altar steps, communion rails and the like, made necessary by the interior architectural plan of the church. With a given church to supply, and the widths and lengths of the kneeling benches, altar steps, and the like to be covered therefore being obtained, it is then only necessary to cut the stock material 3 aforesaid into the required widths and lengths.

The next problem is to cover an end or side, or all ends and sides of the sponge rubber, see for instance the side 4 of the strip 3 shown in Fig. 2. For altar steps 5, see Fig. 1, the front side of the sponge rubber base 1 must be covered to satisfy esthetic requirements. In such case, according to the present embodiment, it is only necessary, see Fig. 2, to make an incision at 6 and another at 7 to remove the portion 8 of sponge rubber base, then bring the portion 9 with its face coinciding with the incision 6 over against the face coinciding with the incision 7, and securing the faces or gaping sides 6 and 7 together by rubber cement, vulcanization, or the like. The incisions 6 and 7 will preferably be determined as to position as shown in Fig. 2, so that the final edge 10, see Fig. 3, will be in alinement with the lower face 11 of the base 1. The position of the incisions 6 and 7 is first of all determined so that the gaping sides coinciding with the incisions 6 and 7 which are to be cemented together to form the joint 12 as shown in Fig. 3, are sides of one and the same material, to wit, sponge rubber, in the interest of producing an effective bond.

It has been found in practice that two portions of sponge rubber can be much more easily bonded to one another than a portion of sponge rubber and for instance a portion of a more dense, relatively hard rubber. In the next place, the incisions must be so located that one extends inwardly from the end 10, as for instance the incision 6, and the other, as for instance the incision 7, extends inwardly from the lower face 11. Furthermore, the incisions 6 and 7 in length are just a little less than the thickness overall of the base 1 and facing material 2 so that when the portion 9 is swung over into the position shown in Fig. 3 and the faces 6 and 7 cemented to one another to form the joint 12, the outer face 10 of the portion 9 will substantially aline with the lower face 11 of the base proper 1.

According to the embodiment illustrated in Fig. 4, the lower faces 13 and 14 corresponding to the faces 10 and 11 of the embodiment illustrated in Fig. 3, will have secured thereto preferably by vulcanization, rubber cement or the like, a positioning element such as a fabric layer 15 extending across the joint 16. Excellent results have been obtained when the fabric layer 15 was about one-half inch in width and extended inwardly from the lower end 17 of the facing material 18 along the faces 13 and 14 well beyond the joint 16, as shown in Fig. 4.

For kneeling benches of pews and priedieus, it is more desirable to have the ends of the mats finished as aforesaid with the facing material 19, see Fig. 5, extending down to the upper face 20 of the wooden kneeling bench 21 adjacent the ends 22 and 23 of the wooden kneeling bench 21. In other words, the ends of the rubber mat 24 of a kneeling bench 21, particularly when one end of such kneeling bench 21, as an instance the end 22, is disposed at the entrance end of a pew, are subjected to considerable wear and tear by the feet of the church attendants, and unless a smooth rounded surface such as that provided at 25 is formed by the method of manufacture just described, not only will the end of the kneeling mat be scuffed, injured and torn, but due to the strain of the scuffing to which such ends 25 are subjected, the end portion of the kneeling mat 24 will frequently actually be torn from the kneeling bench 21. With the present rounded surface 25, especially when as is conventional with kneeling benches, the mat 24 is cemented or otherwise adhesively secured to the upper face of the kneeling bench 21, the tendency to injure the ends of the kneeling mats will be materially diminished, if not entirely prevented.

In some instances, however, as shown in Fig. 6, a quarter round molded rubber stock 26 may be secured by a suitable adhesive material, rubber cement, vulcanization, or the like, to the end of the kneeling mat 27. This quarter round stock 26 may be quarter round as shown in Fig. 7, and preferably have a rounded corner portion 28 to conform to and aline with the rounded portion 29 of the mat 27. The rounded portion 29 may be formed as is the rounded portion of the embodiment shown in Figs. 2 and 3. This quarter round stock 26 may be composed of relatively dense hard rubber molded stock such as shown in Fig. 7, and have nail or screw holes 30 formed therein preferably with washers 31 molded within the stock as shown in Fig. 7 to form limiting stops for the nails or screws 32 which are driven directly into the wooden bench portion 33, as shown in Fig. 7.

Preferably, the mat portion 27 and quarter round stock 26 not only are cemented to one another at 34 but also cemented at 35 to the upper face of the wooden bench 33. This mat portion 27 comprises a sponge rubber base, such as the base 1 of Figs. 2 and 3, and a facing material such as the facing material 2 of Figs. 2 and 3.

In the embodiment shown in Fig. 8, the quarter round stock 36 there shown similar to the quarter round stock 26 shown in Fig. 7, has a piece of fabric 37 adhesively secured by vulcanization or the like to its lower surface which in turn is adhesively secured to the upper face 38 of the wooden bench 39 and in addition, has its flange portion 40 secured to the wooden portion 39 by nails 41 or the like securing means. In addition, the mat portion 42 is also preferably cemented to the stock 36 at 43 and also cemented not only to the upper face of the wooden portion 38 at 44, but also to the upper face of the flange portion 40. This mat portion 42 comprises a sponge rubber base, such as the base 1 of Figs. 2 and 3, and a facing material such as the facing material 2 of Figs. 2 and 3.

In the embodiment shown in Fig. 9, the quarter round stock 45 used in place of the quarter round stock 36 of Fig. 8, is illustrated as composed of wood and secured to the upper face 46 of the wooden bench 47 by nails 48, and in addition, cemented to the upper face of the bench 46 at 49 and also cemented to the side of the mat 50 at 51. Here too, the mat 50 is preferably cemented to the upper face of the wooden bench 47 at 52. This mat portion 50 comprises a sponge rubber base, such as the base 1 of Figs. 2 and 3, and a facing material such as the facing material 2 of Figs. 2 and 3.

In the embodiment shown in Fig. 10, not only the front side alone as shown in Fig. 1, nor the ends alone as shown in Fig. 5, but both ends 53 and 54 and both sides 55 and 56 are rounded by the method illustrated in Figs. 2, 3 and 4. At the corners, the rounded stock is mitered as shown at 57 in the interest of appearance since the ends 53 and 54 and sides 55 and 56 would otherwise result in right-angular recesses at the corners.

In the embodiment illustrated in Figs. 11 and 12, the curved ends of the mat are formed in still another manner. Here, see Fig. 11, an incision is made at 157, skiving off a triangular piece from the end of the sponge rubber base 58 starting at a point in the lower face 59 of the rubber base and ending at the outer end 60 of the base 58 adjacent to the facing material 61. The mat so cut, see Fig. 11, has its lower face 59 cemented to the upper face 160 of the wooden bench portion 161 of a kneeler, and then the portion adjacent the incision 157 drawn down into the portion 62 shown in Fig. 12 until the outer end at 60 of the facing material 61 extends to and engages the upper face 160 of the wooden bench portion 161 and the face 157 compressed as shown into a narrower area and then is also cemented to the upper face 160 of the wooden bench portion 161. This embodiment has the advantage that the portion 62 so condensed will offer a greater resistance to wear and tear by scuffing and the like.

In Fig. 13, the diminished end portion 63 after having been bent down so that the end of its facing material 64 extends down to the level of the lower face of the base 65, has adhesively secured thereto a short sheet of fabric 66 to constitute a reenforcement to maintain the diminished end portion 63 compressed into the rounded end portion shown in Fig. 13. Thereupon, the resulting mat 67 will be adhesively secured to the upper face 68 of the wooden bench portion 69 in the usual way with the short fabric sheet 66 securing the diminished end portion 63, to the base 65, and another long piece extending under the short piece 66 and all the way under the base 65 and securing the same to the face 68 of the bench portion 69.

It is obvious that various changes and modifications may be made to the details of the article and the method of forming the same without departing from the general spirit of the invention, as set forth in the appended claims.

What I claim is:

1. The method of forming a kneeling mat for a church pew, priedieu, altar step, communion rail or the like with a rounded end portion, consisting in cutting a prepared stock composed of a base of sponge rubber with a dense, relatively hard rubber facing material secured thereto into a strip having a predetermined length and width, then removing a section of the sponge rubber base from the end portion adjacent an edge of the resulting strip, then bending down the end portion where the section has been removed with the facing material extending down to the lower level of the sponge rubber base, and adhesively securing a sheet of fabric to the lower face of the rubber base and the lower face of the end portion when alined with the lower face of the rubber base to convert the end portion into a rounded end portion.

2. A kneeler comprising a wooden kneeling bench, and a kneeling mat having a rounded end portion, the kneeling mat having a sponge rubber base, a dense, relatively hard rubber facing material secured to the upper face of said base, a section removed from the end portion of the base adjacent an edge of the mat, the diminished end portion where the section has been removed bent down with the dense, relatively hard rubber facing material at such end extending down to the lower level of the sponge rubber base, and a sheet of fabric adhesively secured between the upper face of the bench and the lower face of the base and the lower edge of the diminished end portion.

3. The method of forming a kneeling mat for a church pew, priedieu, altar step, communion rail or the like, consisting in cutting a prepared stock composed of a base of sponge rubber with a dense, relatively hard rubber facing material secured thereto into a strip having a predetermined length and width, then removing a sector of the sponge rubber base adjacent an edge of the resulting strip and spaced from the facing material, then cementing together the gaping sides of the base from which the sector has been removed, with the facing material extending down to the lower level of the sponge rubber base, and then cementing the lower faces of the base and end portion to a positioning element.

4. The method of forming a kneeling mat for a church pew, priedieu, altar step, communion rail or the like, consisting in cutting a prepared stock composed of a base of sponge rubber with a dense, relatively hard rubber facing material secured thereto into a strip having a predetermined length and width, then removing a segment of the sponge rubber base adjacent an edge of the resulting strip, then cementing together the gaping sides of the base from which the segment has been removed, with the facing material rounded down along the edge so prepared and extending to the lower level of the sponge rubber base, and securing a fabric to the lower alined faces at either side of the joint formed by cementing the said gaping sides to one another.

5. The method of forming a kneeling mat for a church pew, priedieu, altar step, communion rail or the like, consisting in cutting a prepared stock composed of a base of sponge rubber with a dense, relatively hard rubber facing material secured thereto into a strip having a predetermined length and width, then removing a sector of the sponge rubber base spaced from the facing material and adjacent the edge of the resulting strip to form an end portion, then cementing together the gaping sponge rubber sides of the base from which the sector has been removed, the sponge rubber of the end portion with the hard rubber facing material being rounded down along the edge so prepared and extending to the lower level of the sponge rubber base, to form a substantially plane lower face, and then cementing the lower faces of the base and end portion in such plane to a positioning element.

6. A kneeling mat for a pew, priedieu, altar step, communion rail or the like, having a sponge rubber base, a dense, relatively hard rubber facing material secured to the upper face of said base, a sector removed from the base spaced from the facing material and adjacent an edge of the mat to form an end portion, with the gaping sponge rubber sides from which the sector has been removed secured to one another with the sponge rubber of the end portion bent down and the dense, relatively hard rubber facing material at such end portion extending down to the lower level of the sponge rubber base and means secured to the lower faces of said base and end portion to position said end portion and adjacent base to form a plane lower face.

7. A kneeler comprising a wooden kneeling bench, and a keeling mat, the kneeling mat having a sponge rubber base, a dense, relatively hard rubber facing material secured to the upper face of said base, a sector removed from the base spaced from the facing material and adjacent an edge of the mat to form an end portion, with the gaping sides of the sponge rubber base from which the sector has been removed cemented to one another to form a joint and the sponge rubber of the end portion bent down with the dense, relatively hard rubber facing material at such end extending down to the lower level of the sponge rubber base and means for securing the lower faces of the base and end portion to the upper face of said bench as a positioning element with said end portion bent down to form a substantially plane lower face.

8. A kneeling mat having a sponge rubber base, a dense, relatively hard rubber facing material cemented to the upper face of said base, a sector removed from the base spaced from the facing material and adjacent an edge of the mat to form an end portion, the sector coinciding with incisions one extending from an end of the mat and another extending from the lower face of the mat, the incisions intersecting one another at a point where each incision is substantially equal in length to the other, a cemented joint formed by the gaping sponge rubber sides from which the sector has been removed, secured to one another, with the sponge rubber of the end portion bent down and the dense, relatively hard rubber facing material at such end portion extending down to the lower level of the sponge rubber base, and means secured to the lower faces of said base and end portion to position said end portion and adjacent base to form a substantially plane lower face.

HERBERT S. MAY.